United States Patent [19]

Williams et al.

[11] Patent Number: 5,018,132

[45] Date of Patent: May 21, 1991

[54] SONET 4H BYTE RECEIVER AND FILTER

[75] Inventors: Timothy J. Williams; Ertugrul Baydar, both of Raleigh, N.C.

[73] Assignee: Alcatel NA Network Systems Corp., Raleigh, N.C.

[21] Appl. No.: 351,538

[22] Filed: May 12, 1989

[51] Int. Cl.[5] .......................... H04J 1/16; H04J 3/14; H04J 3/12
[52] U.S. Cl. .................................... 370/13; 370/110.1
[58] Field of Search ................... 370/110.1, 58.1, 58.2, 370/58.3, 60, 60.1, 94.1, 94.2, 94.3, 1, 13

[56] References Cited
U.S. PATENT DOCUMENTS
4,967,405 10/1990 Upp et al. .......................... 370/58.1

Primary Examiner—Douglas W. Olms
Assistant Examiner—Wellington Chin
Attorney, Agent, or Firm—Peter C. Van Der Sluys

[57] ABSTRACT

A filtering algorithm for the SONET H4 byte is implemented with circuitry including an internal H4 counter which is incremented each frame and is locked to a received H4 byte once every 24 frames if a proper bit sequence is detected in a designated frame. If the designated bit sequence is not detected, the counter is not reset and continues to be incremented. If parity errors are detected, the counter is not reset and is allowed to free run to simulate the appropriate H4 byte input.

11 Claims, 5 Drawing Sheets

| FIG. 5A | FIG. 5B |

SONET 4H BYTE RECEIVER AND FILTER

BACKGROUND OF THE INVENTION

The present invention relates to SONET transmission systems, and more particularly to apparatus for receiving and filtering the SONET Path Overhead H4 Multiframe Indicator byte.

DESCRIPTION OF THE PRIOR ART

The American National Standard Institute, Inc. (ANSI) T1.105-1988 describes the Synchronous Optical Network (SONET) protocol for telecommunications equipment. This standard is incorporated herein by reference. The SONET protocol is particularly adapted for optical transmission, and various transmission levels have been standardized at specified line rates in M bit/s. The first level, Optical Carrier Level 1, or OC-1, transmits data at the rate of 51.84 M bits/s. This carrier level has a corresponding electrical level called Synchronous Transport Signal Level 1, or STS-1.

In order to access this high-frequency carrier level, access products are required so that lower bandwidth carriers can be extracted from the STS-1 transmission level. These access products provide a SONET network with nodes where components of an STS-1 signal can be dropped out of the main signal. The components that are extracted must be reorganized to produce a signaling format compatible with currently-used telephone standards. A typical sub-component of an STS-1 signal would be a DS1 signal having a bit rate of 1.544 M bits/s. Twenty-eight DS1 signals can be supported by an STS-1 carrier. Within the DS1 signal format, an additional 24 DS0 64K bits/s signals can be supported.

The SONET transmission is serial in frames, comprising a total of 810 bytes each. The frame structure for an STS-1 is shown in FIG. 1. The frame comprises 90 columns ×9 rows of bytes, with 8 bits per byte. The sequence of transmission of the bytes is row by row, from left to right. The frame is divided into three parts: the section and line overhead, which are contained in the first three columns; and the payload, which is found in the 87 remaining columns, which, in connection with the nine rows, form a Synchronous Payload Envelope, SPE, which includes 783 bytes. The SPE can begin anywhere within the 87×9 byte envelope. Typically, the SPE begins in one SONET frame and ends in another. A payload pointer provided in overhead bytes H1 and H2 points to the byte where the SPE begins, shown as P=O in FIG. 1. Nine of the SPE bytes are allocated to path overhead. These bytes appear in one column, which can be any column in the SPE. The first path overhead byte is J1, which is always in the first SPE byte, P=0.

The information within the SPE is transported in Sub-STS-1 payloads called Virtual Tributaries, or VTs. There are several levels of VTs; however, it is only necessary to deal with VT 1.5 for purposes of describing this invention. When the STS-1 payload supports 28 DS1 services, one VT at the 1.5 level is provided for each DS1 service. FIG. 2 illustrates the payload mapping of SONET bytes into a DS1.

An SPE consists of 783 bytes belonging to 28 tributaries, wherein each tributary can carry a DS1 payload, as illustrated in FIG. 2. A DS1 payload has 27 bytes, 24 of which carry DS0 channels. The first byte carries a VT pointer, or address; a second byte is unused; and the third byte carries signaling data for the DS1 payload. Every channel requires four signaling bits, namely, A, B, C and D, as is well known in the telephony art. For a DS1 payload of 24 channels, a total of 96 signaling bits are required. Since only four bits of signaling are carried in each SONET signaling byte and there is only one signaling byte per tributary or DS1, a total of 24 SONET frames would be required in order to transmit the 96 required signaling bits for a DS1, these 24 frames are cumulatively called a superframe or a signaling frame.

From the above, it is apparent that a means must be provided to clearly identify the SONET frames that are being received. In addition, it is essential for signaling purposes that the frame identification also indicate the relationship of the frame being received to the 24-frame superframe. It is apparent that the 24-frame superframe can be divided into four phases consisting of frames 1-6, 7-12, 13-18 and 19-24 for transmitting respectively the A, B, C and D signaling bits.

To provide for this identification, the SONET protocol defined a specific path overhead byte for identifying, via defined bit sequences, the next SONET frame to be transmitted or received. This byte is referred to as the H4 byte shown in the path overhead column of FIG. 1. The H4 byte serves as a multiframe indicator for signaling and framing purposes. The H4 byte identifies the signaling frame (24-frame superframe) and the framing for the Virtual Tributaries (VTs).

The H4 byte is assigned to column 0 and row 5 of the SPE. However, taking into account that the SPE may start at any location within the 87-column ×9-row envelope, the H4 byte can actually appear anywhere, as is shown in FIG. 1. The H4 byte always identifies the next frame that is to arrive or to be transmitted. The format of the H4 byte is as follows:

| Bit No. | MSB 7 | 6 | 5 | 4 | 3 | 2 | 1 | LSB 0 |
|---|---|---|---|---|---|---|---|---|
| Data | P1 | P0 | SI2 | SI1 | C3 | C2 | C1 | T |

The relationship between the H4 bytes and the signaling byte contents are shown in Table 1. Referring to Table 1, it should be noted that the frames are numbered from 0-23. Table 1 shows the bit states for the H4 byte for each frame, and adjacent to that is shown the signaling information for the corresponding SONET byte for what is known as the extended superframe signaling. Bits C3, C2 and C1 of the H4 byte have been deleted from Table 1, primarily because these bits are not relevant to the transmission standards which require the A, B, C and D signaling bits.

Referring to Table 1, the T-bit toggles for each STS-1 SONET frame. The T-bit, combined with the SI2 and SI1 bits form a modulo-6 counter. The P1 and P0 bits form a modulo-4 counter. The concatenation of these counters creates a three usec frame for the 24-frame superframe.

A review of Table 1 reveals the sensitivity of the H4 byte data. A single error in one bit of the H4 byte could result in significant errors in the signaling for at least four different channels. Thus, a means was required to prevent erroneous H4 bytes from distorting signaling data. A means was required to filter transmission errors from the received H4 byte.

SUMMARY OF THE INVENTION

The present invention contemplates the implementation of a filtering algorithm for the SONET H4 byte, which algorithm was developed to solve the above-mentioned problem. The algorithm compensates for errors introduced by the SONET transmission line.

TABLE 1

| | SIGNALING FRAME SEQUENCE | | | | | | | | |
|---|---|---|---|---|---|---|---|---|---|
| | H4 | | | | | ESF | | | |
| FR | P1 | P0 | SI2 | SI1 | T | S1 | S2 | S3 | S4 |
| 0  | 0 | 0 | 0 | 0 | 0 | A0  | A1  | A2  | A3  |
| 1  | 0 | 0 | 0 | 0 | 1 | A4  | A5  | A6  | A7  |
| 2  | 0 | 0 | 0 | 1 | 0 | A8  | A9  | A10 | A11 |
| 3  | 0 | 0 | 0 | 1 | 1 | A12 | A13 | A14 | A15 |
| 4  | 0 | 0 | 1 | 0 | 0 | A16 | A17 | A18 | A19 |
| 5  | 0 | 0 | 1 | 0 | 1 | A20 | A21 | A22 | A23 |
| 6  | 0 | 1 | 0 | 0 | 0 | B0  | B1  | B2  | B3  |
| 7  | 0 | 1 | 0 | 0 | 1 | B4  | B5  | B6  | B7  |
| 8  | 0 | 1 | 0 | 1 | 0 | B8  | B9  | B10 | B11 |
| 9  | 0 | 1 | 0 | 1 | 1 | B12 | B13 | B14 | B15 |
| 10 | 0 | 1 | 1 | 0 | 0 | B16 | B17 | B18 | B19 |
| 11 | 0 | 1 | 1 | 0 | 1 | B20 | B21 | B22 | B23 |
| 12 | 1 | 0 | 0 | 0 | 0 | C0  | C1  | C2  | C3  |
| 13 | 1 | 0 | 0 | 0 | 1 | C4  | C5  | C6  | C7  |
| 14 | 1 | 0 | 0 | 1 | 0 | C8  | C9  | C10 | C11 |
| 15 | 1 | 0 | 0 | 1 | 1 | C12 | C13 | C14 | C15 |
| 16 | 1 | 0 | 1 | 0 | 0 | C16 | C17 | C18 | C19 |
| 17 | 1 | 0 | 1 | 0 | 1 | C20 | C21 | C22 | C23 |
| 18 | 1 | 1 | 0 | 0 | 0 | D0  | D1  | D2  | D3  |
| 19 | 1 | 1 | 0 | 0 | 1 | D4  | D5  | D62 | D7  |
| 20 | 1 | 1 | 0 | 1 | 0 | D8  | D9  | D10 | D11 |
| 21 | 1 | 1 | 0 | 1 | 1 | D12 | D13 | D14 | D15 |
| 22 | 1 | 1 | 1 | 0 | 0 | D16 | D17 | D18 | D19 |
| 23 | 1 | 1 | 1 | 0 | 1 | D20 | D21 | D22 | D23 |

In implementing the algorithm, a receive side of an access product filters the received H4 byte, and a slave H4 byte generator is locked to the received H4 byte. The filtering of the received H4 byte is accomplished by locking the slave H4 generator to the received H4 byte once every 24 frames, if no parity errors are detected in the received frame. Since the C3, C2 and C1 bits are not used by the access product, a five-bit counter functions as the H4 byte generator. The received H4 byte content is checked once during a superframe, and if no errors are detected, the counter is reset to 0 at the appropriate frame time. The H4 value of the counter is loaded into internal latches at the beginning of each frame for use by the receiving side of the access product. If a parity error is detected, the counter is not reset and it is no longer locked to the incoming H4 byte.

One objective of the present invention is to provide a filtering algorithm for the SONET H4 byte which compensates for errors introduced by the SONET transmission line.

Another objective of the present invention is to provide for the continued simulation of received H4 bytes in the event of an error condition being sensed on the transmission line.

DESCRIPTION OF THE INVENTION

A filtering algorithm has been developed for compensating for errors that may be introduced in the SONET transmission of the path overhead H4 byte. The present invention discloses the filtering algorithm and circuitry for implementing said algorithm. The received H4 byte is filtered, and a slave H4 generator is locked to the received H4 byte if no errors are detected.

Figure 1:
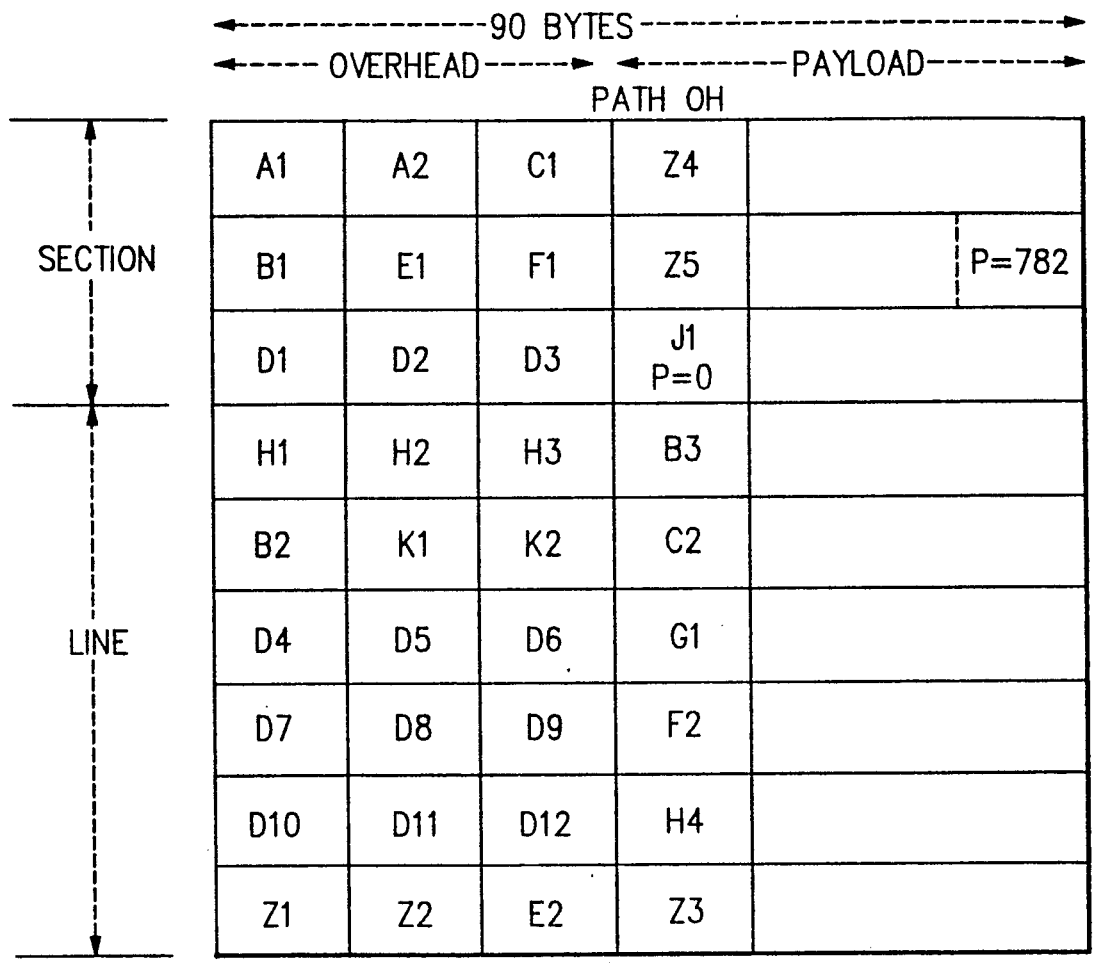
FIG. 1 shows the format of an STS-1 SONET frame.
Figure 2:
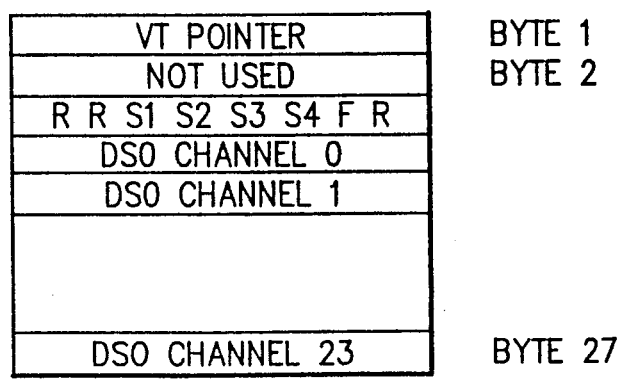
FIG. 2 shows the payload mapping of a DS1 transmission line.
Figure 3:
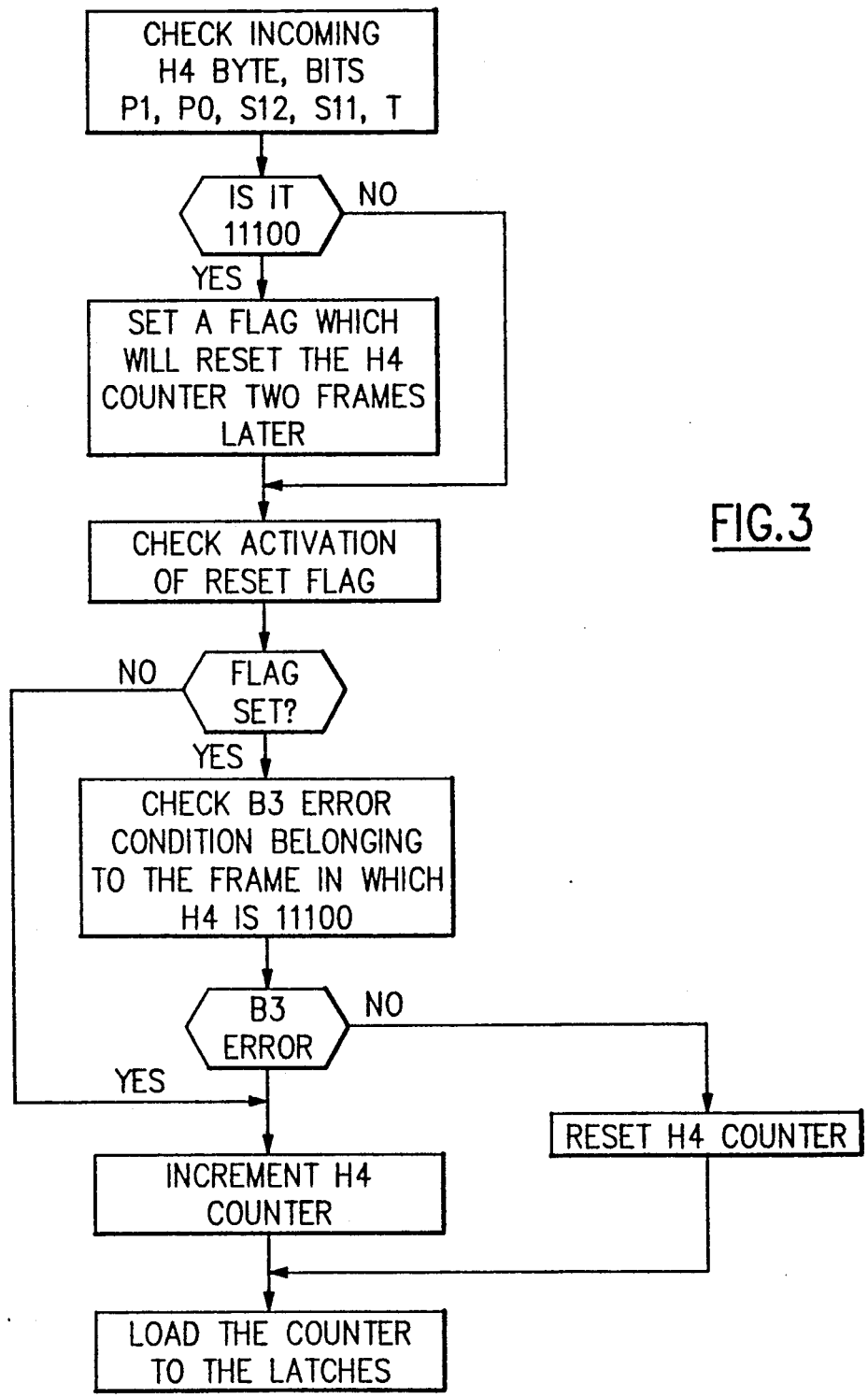
FIG. 3 shows a flow chart of an algorithm for received H4 byte filtering.

Referring to FIG. 3, there is shown a flow chart of the receive portion of the algorithm. All incoming eight-bit SONET bytes are sensed to detect the presence of a particular H4 sequence corresponding to frame 22 shown in Table 1. When this sequence is sensed during the occurrence of an H4 byte, a flag is set which functions to reset an internal H4 counter two frames later during frame 0. The reset flag is a two-stage shift register that is shifted once per frame and is formed by two serially-connected flip-flops, the output of the second flip-flop is of the output of the shift register. If the H4 sequence for frame 22 is not sensed, the counter is not automatically reset two frames later. The output of the shift register, which represents the reset flag, is checked for activation. If the reset flag has not been set, the counter is incremented. If the reset flag has been set, a check is made of the B3 error condition for the frame in which H4 has the sequence for frame 22. The B3 error condition represents a payload parity error. If a B3 error condition is detected, the counter is allowed to increment in the normal manner, and the output is loaded to the latches. If a B3 error is not detected, the counter is then reset to the sequence for frame 0, and the counter output is loaded to the latches.

Figure 4:
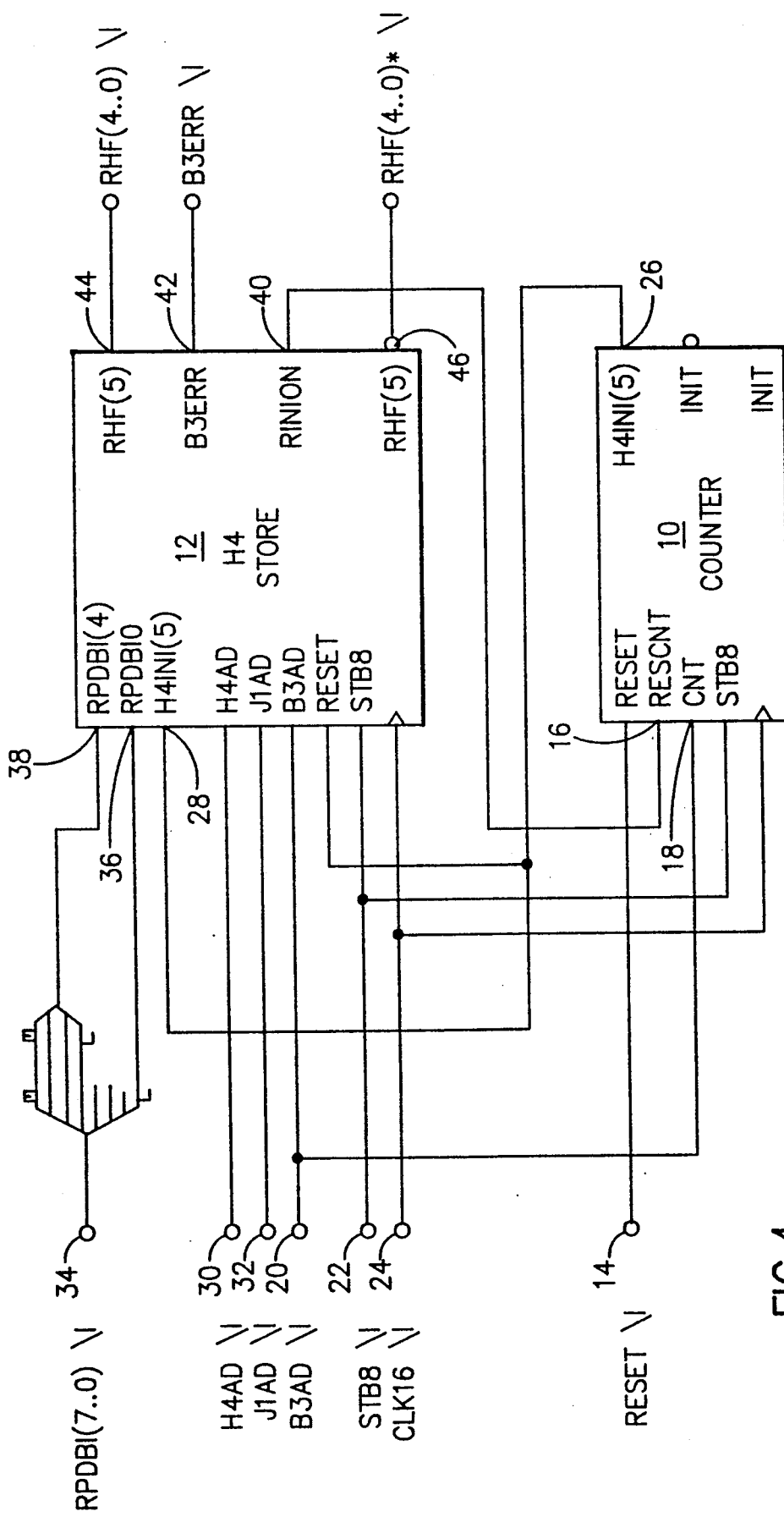
FIG. 4 shows a block diagram of an implementation of the algorithm shown in FIG. 3.

Referring to FIG. 4, there is shown an implementation of the algorithm represented by the flow chart of FIG. 3. This algorithm is implemented on the receive side of an access product, and the implementing circuitry includes an internal counter 10 and a receive H4 storage circuit 12. The counter 10 has an input for receiving a reset signal from a terminal 14 when the multiplexer is powered up or reset. An input 16 to counter 10 is adapted to receive a counter reset signal from an output 40 of the H4 storage circuit 12. A control input 18 is connected to a terminal 20 for receiving a signal that is active during the B3 byte time. A terminal 22 receives the 8-MHz clock signal, while terminal 24 receives 16-MHz clock signal. Counter 10 has an output 26 which provides five parallel bits corresponding to internally-generated H4 bytes corresponding to the bit sequences shown in Table 1. The output of counter 10 is connected to an input 28 of the H4 store circuit 12. Circuit 12 receives a plurality of timing inputs, including an input from a terminal 30 which is active during the H4 byte time, an input from terminal 32 which is active during the J1 byte time, an input from terminal 20 which is active during the B3 byte time, a reset input from terminal 14, and the 8-MHz and 16-MHz clocks from terminals 22 and 24 respectively.

A terminal 34 is connected to receive all eight bits of each SONET byte on eight parallel inputs. Selected from these eight parallel inputs are the least significant bit which is provided to an input 36 of circuit 12, and the four most significant bits which are provided to input 38 as four parallel input bits. Circuit 12 provides four outputs, one of which is a counter reset signal provided on output 40. A B3 error signal is provided at an output 42. Outputs 44 and 46 each provide five parallel output bits corresponding to the H4 byte, with output 46 providing the inverse of output 44.

Figures 5, 5A:
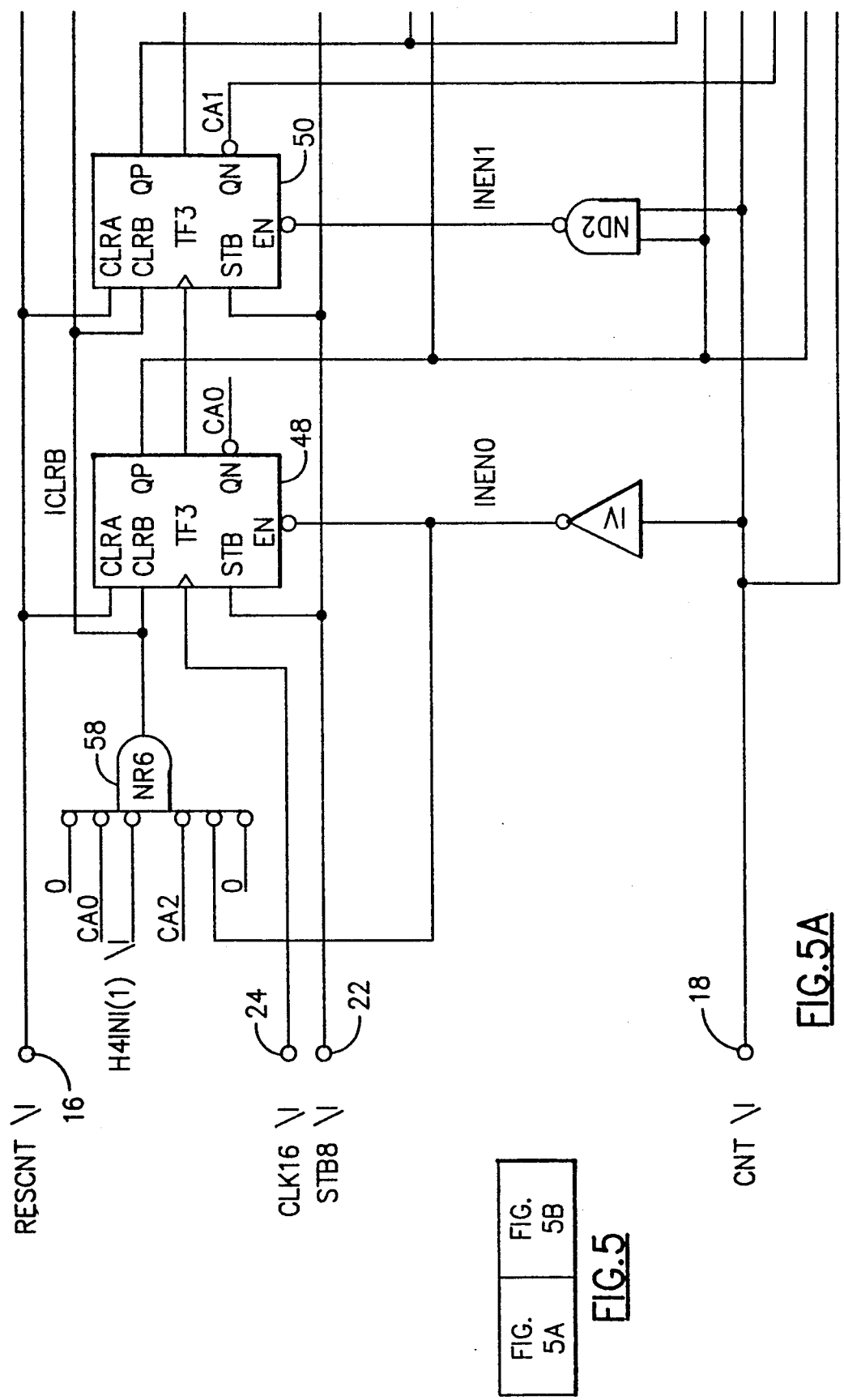
FIGS. 5A and 5B are a schematic diagram of the counter of FIG. 4.
Figure 5B:
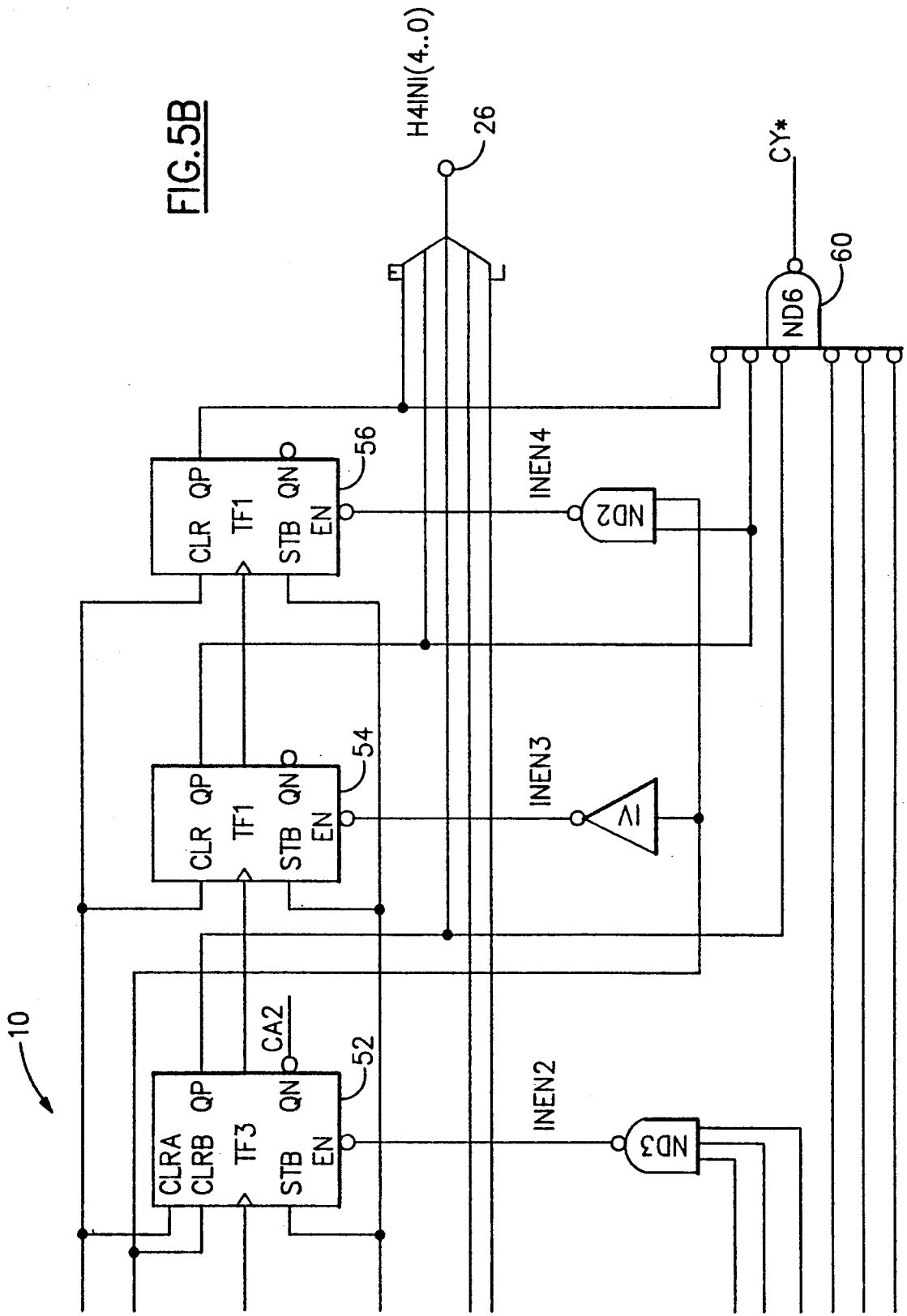

Referring to FIG. 5, there is shown the counter 10 of FIG. 4. Counter 10 comprises five flip-flops 48–56 for generating the output signals for output 26. The counters each have a clear input connected to terminal 16 for resetting or loading 0s into the counter in response to a signal at terminal 16. Terminal 18 receives an active signal during the period of byte B3. This signal is provided to the enable inputs of flip-flops 48, 50 and 52, which flip-flops also receive the 8-MHz and 16-MHz clock signals. Flip-flops 48, 50 and 52 are interconnected so as to form a modulo-6 counter and to provide respectively the T, SI1 and SI2 bits of the H4 byte shown in Table 1. A gate 58 has a plurality of inputs, two of which are connected to a 0-level signal. One is connected to the inverted output of flip-flop 48, another is connected to bit 1 of the five output bits at terminal 26, another is connected to the inverting output of flip-flop 52, and the last is connected to terminal 18 to receive an active signal during the B3 byte. Gate 58 provides an output during the enable signal received after frame 5, shown in Table 1, which is connected to a clear input of flip-flops 48, 50 and 52 and also to the enable inputs of flip-flops 54 and 56 through an inverter and a gate respectively. The output of gate 58 provided to the enable input of flip-flop 54 allows its state to change at the next clock pulse, thereby initiating a one-state in a modulo-4 counter formed by bits 6 and 7 of the H4 byte. The outputs of the flip-flops are connected to a gate 60 which provides an output that is not used for the present invention.

Figure 6:
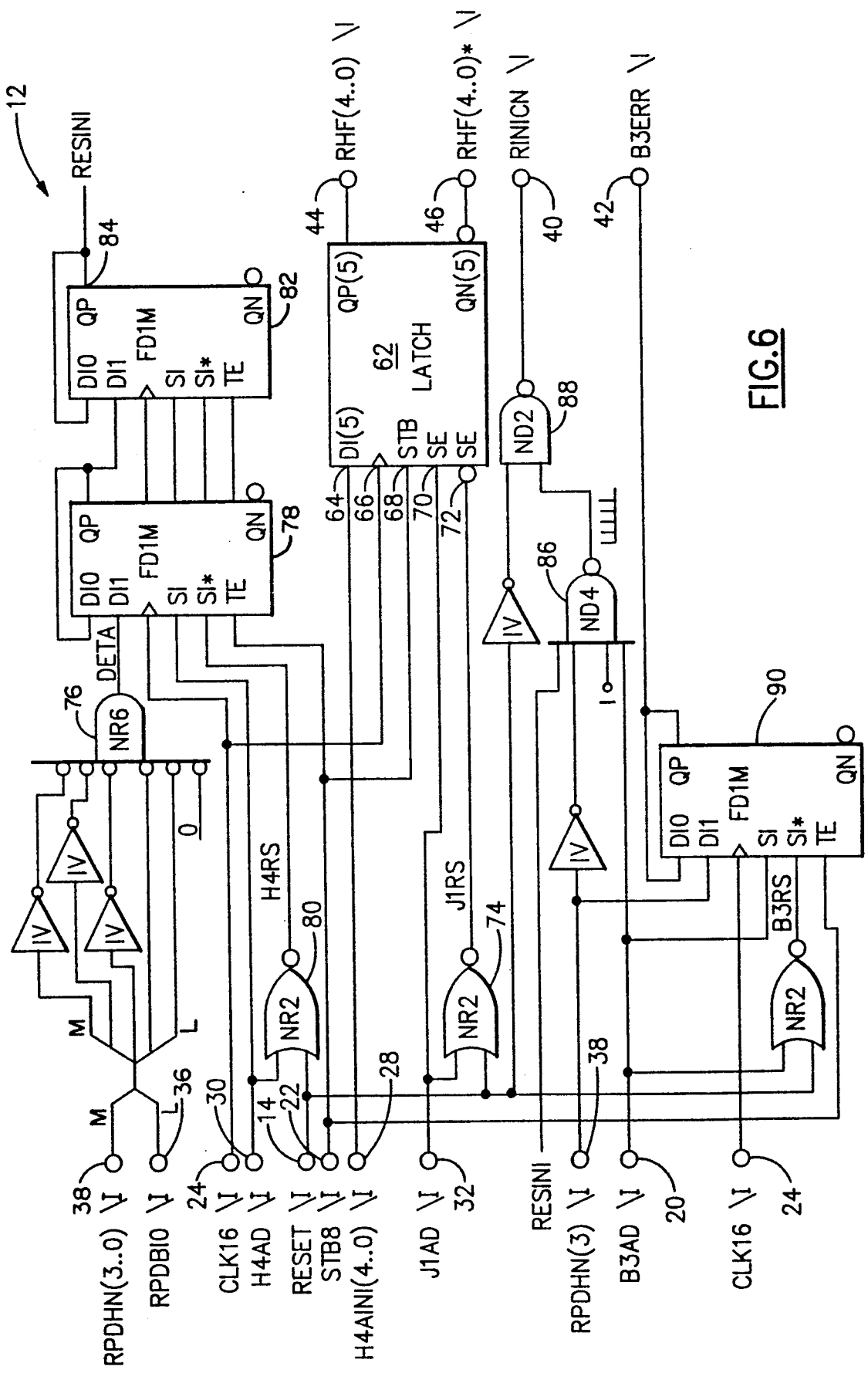
FIG. 6 is a schematic diagram of the H4 store of FIG. 4.

Referring to FIG. 6 there is shown a schematic diagram of the H4 store circuit 12. Circuit 12 includes a latch circuit 62 which comprises five flip-flops, one for each of the H4 bits used in the receive side of the access product. Latch 62 includes an input 64 connected to terminal 28 for receiving the output of counter 10. Inputs 66 and 68 are connected to receive the 16-MHz and 8-MHz clock signals respectively. Input 70 is connected to terminal 32 for receiving an active bit during the J1 byte time, while an input 72 is connected to receive through a gate 74 an inverted input during the J1 byte time and during a reset input on terminal 14. Latch 62 has two outputs which form the outputs 44 and 46 of circuit 12. Thus, latch 62 comprises five flip-flops which load the bits at the output of counter 10 during the J1 byte of each frame.

Input 38 receives the four most significant bits of each SONET byte, while input 36 receives the least significant bit of each SONET byte. Inputs 36 and bit 4 of the SONET byte are connected directly to a gate 76 while bits 5, 6 and 7 of the SONET byte are connected to the input of gate 76 through inverters. Gate 76 functions to detect a bit sequence of 11100, which sequence occurs in the H4 byte of frame 22 as shown in Table 1. The output of gate 76 provides a frame 22 detection signal to a first flip-flop 78. Flip-flop 78 receives the 16-MHz and 8 MHz clock signals from terminals 24 and 22, and the reset signal from terminal 14 provided through a gate 80. In response to the timing signals and the presence of an active H4 byte signal on input 30, flip-flop 78 loads the output of gate 76 so that flip-flop 78 provides a one-level output indicating that the bit sequence for the H4 byte for frame 22 was detected. The output of flip-flop 78 is passed on to a flip-flop 82 which has an output 84, thereby providing a two-frame delay of the frame 22 detection signal, which signal is sustained for a one-frame period.

A gate 86 is provided to check if a B3 error occurred in frame 22. The error detection circuitry has an inherent 2-frame delay thus necessitating the 2-frame delay of the frame 22 detection signal so it coincides with the B3 byte that would indicate an error in frame 22. Gate 86 is connected to receive at its inputs the output 84 of flip-flop 82, the most significant bit of the SONET byte being sensed on input 38, which bit is provided to gate 86 through an inverter, a 1 level signal, and an input which is active during the B3 byte. If the frame 22 bit sequence for the H4 byte was detected two frames earlier, the output 84 of flip-flop 82 will be at a 1 level. During the B3 byte the input 20 will also be at a 1 level. During this period of time the input at terminal 38 will be the B3 byte, and the most significant bit will represent the B3 flag or the payload parity signal which, if there are no errors detected, will be at a 0 level. The inverter will therefore provide a 1 level signal to the input of gate 86. Thus, all inputs to gate 86 will be at a 1 level if there is no detected parity error and the proper H4 bit sequence was detected by gate 76, and gate 86 will provide a zero level output. The zero level signal provided by gate 86 is provided to a gate 88 which in response thereto will provide the output 40 of H4 store circuit 12, which output is connected to the counter 10 for resetting the counter to all 0s. Gate 88 has a second input connected through an inverter to the reset input 14, which causes the counter to be reset to all 0s when the multiplexer is first turned on.

A flip-flop 90 is connected to receive the most significant bit connected to input 38 and to receive a B3 byte time signal at input 20, so that flip-flop 90 is set when the B3 byte indicates a parity error. The output of flip-flop 90 is provided to terminal 42 as the B3 error signal from circuit 12.

Thus, the present invention provides an algorithm and an implementation thereof for filtering received H4 bytes, in which an internal H4 counter is incremented each frame and is locked to the received H4 byte once every 24 frames. The internal H4 counter is allowed to run free if a parity error in the received H4 byte is detected.

What is claimed is:

1. In an access apparatus for a SONET transmission system of the type that transmits information in frames, each frame having tributaries with channels, a plurality of frames forming a superframe, a device for processing H4 bytes, comprising:
    means for receiving SONET-formatted bytes from the SONET transmission system;
    means for extracting H4 bytes from the received SONET bytes;
    means for sensing an alarm condition related to the received SONET bytes;
    means for sequentially generating H4 bytes for each SONET frame; and
    means for periodically locking said H4 byte generating means to the received H4 bytes, said locking means being responsive to said alarm sensing means to prevent said periodic locking when an alarm condition is sensed, whereby the H4 byte generating means is periodically locked to the received H4 bytes when no alarm condition is sensed and continues to sequentially generate H4 bytes in a free-running manner if an alarm condition is sensed.

2. An access apparatus as described in claim 1, wherein the means for sequentially generating H4 bytes comprises a clock which is incremented once per SONET frame.

3. An access apparatus as described in claim 1, wherein the means for locking comprises a means for sensing the presence of a first predetermined H4 byte in the received H4 bytes, and in response thereto for resetting the generating means to generate a second predetermined H4 byte.

4. An access apparatus as described in claim 3, wherein the means for resetting the generating means includes means for delaying said resetting for a predetermined number of bytes to allow an alarm condition to be sensed relative to the received first predetermined H4 byte.

5. An access apparatus as described in claim 4, wherein the H4 byte generating means comprises an incremented counter and said resetting means resets said counter to a predetermined value corresponding to said second predetermined H4 byte.

6. An access apparatus as described in claim 1, additionally comprising latching means for storing the output of the H4 byte generating means for one SONET frame time.

7. A method for filtering received H4 bytes in an access apparatus for a SONET transmission system of the type that transmits information in frames, each frame having tributaries with channels, a plurality of frames forming a superframe, said method comprising the steps of:

receiving SONET-formatted bytes from the SONET transmission system;

extracting H4 bytes from the received SONET bytes;

sensing an alarm condition related to the received SONET bytes;

sequentially generating H4 bytes for each SONET frame in a generating means;

periodically locking said H4 byte generating means to the received H4 bytes if no alarm condition has been sensed, whereby the H4 byte generating step is controlled to periodically lock the generated bytes to the received H4 bytes when no alarm condition is sensed and the generating means continues to sequentially generate H4 bytes in a free-running manner if an alarm condition is sensed.

8. A method as described in claim 7, wherein the step of periodically locking said H4 bytes comprises the steps of:

sensing the presence of a first predetermined H4 byte in the extracted H4 bytes; and generating a second predetermined H4 byte if the first predetermined H4 byte was sensed in the received H4 bytes.

9. A method as described in claim 8, additionally including the step of delaying the generating of the second predetermined H4 byte after the sensing of the first predetermined H4 byte by a predetermined number of bytes to allow an alarm condition to be sensed relative to the received first predetermined H4 byte.

10. A method as described in claim 7, wherein the step of sequentially generating H4 bytes comprises the step of incrementing a counter.

11. A method as described in claim 7, additionally comprising the step of providing the sequentially-generated H4 bytes to a latch for storing said generated H4 byte for one SONET frame.

* * * * *

UNITED STATES PATENT AND TRADEMARK OFFICE
CERTIFICATE OF CORRECTION

PATENT NO. : 5,018,132
DATED : May 21, 1991
INVENTOR(S) : Williams et al

It is certified that error appears in the above-identified patent and that said Letters Patent is hereby corrected as shown below:

ON TITLE PAGE: line 3, please delete "4H" and insert --H4--.

Signed and Sealed this

Fifteenth Day of September, 1992

Attest:

DOUGLAS B. COMER

Attesting Officer                Acting Commissioner of Patents and Trademarks